(12) United States Patent
Blundell (10) Patent No.: US 11,084,325 B2
(45) Date of Patent: Aug. 10, 2021

(54) VEHICLE TRACTION ENHANCEMENT

(71) Applicant: COVENTRY UNIVERSITY, Coventry (GB)

(72) Inventor: Mike Blundell, Coventry (GB)

(73) Assignee: COVENTRY UNIVERSITY, Coventry (GB)

( * ) Notice: Subject to any disclaimer, the term of this patent is extended or adjusted under 35 U.S.C. 154(b) by 1 day.

(21) Appl. No.: 16/321,184

(22) PCT Filed: Jul. 21, 2017

(86) PCT No.: PCT/GB2017/052148
§ 371 (c)(1),
(2) Date: Jan. 28, 2019

(87) PCT Pub. No.: WO2018/020220
PCT Pub. Date: Feb. 1, 2018

(65) Prior Publication Data
US 2019/0168541 A1 Jun. 6, 2019

(30) Foreign Application Priority Data

Jul. 29, 2016 (GB) ..................................... 1613121
Sep. 29, 2016 (GB) ..................................... 1616543

(51) Int. Cl.
*B60B 39/00* (2006.01)
*B60B 39/02* (2006.01)

(52) U.S. Cl.
CPC .......... *B60B 39/025* (2013.01); *B60B 39/022* (2013.01); *B60B 39/026* (2013.01)

(58) Field of Classification Search
CPC ... B60B 39/025; B60B 39/022; B60B 39/026; B60B 39/00
(Continued)

(56) References Cited

U.S. PATENT DOCUMENTS 3,289,668 A * 12/1966 Drucker ................ B60B 39/028
126/271.1
3,544,370 A * 12/1970 Wrede ................... B60B 39/026
134/37
(Continued)

FOREIGN PATENT DOCUMENTS

DE 2555282 A1 6/1977
DE 2600787 A1 * 7/1977 ........... B60B 39/026
(Continued)

OTHER PUBLICATIONS

Translation of DE 2600787 A1 accessed at espacenet on May 5, 2020. (Year: 1977).*
(Continued)

*Primary Examiner* — James A Shriver, II
*Assistant Examiner* — Hilary L Johns
(74) *Attorney, Agent, or Firm* — Withrow & Terranova, P.L.L.C.; Vincent K. Gustafson (57) ABSTRACT

A vehicle (100) comprising a plurality of wheels (106a, b) and an apparatus on a wheeled vehicle are disclosed. The vehicle, or apparatus, comprises a control system arranged to issue a signal in the event of determining that one or more wheels of the vehicle has lost, or is at risk of losing, frictional contact with a road surface (104). The vehicle, or apparatus, further comprises a gas source arranged to supply a burst of gas upon said signal being issued. At least one gas outlet (112) is connected to said gas source and is arranged to direct said burst of gas so as to clear water and/or debris from the road surface in front of at least one of the wheels.

18 Claims, 4 Drawing Sheets

(58) Field of Classification Search
USPC .......................................................... 180/271
See application file for complete search history.

(56) References Cited

U.S. PATENT DOCUMENTS

| | | | | |
|---|---|---|---|---|
| 4,063,606 | A | 12/1977 | Makinson | |
| 5,100,175 | A * | 3/1992 | Swallow | B60B 39/023 239/567 |
| 5,555,594 | A * | 9/1996 | Maddalena | B60B 39/026 15/313 |
| 7,198,111 | B2 * | 4/2007 | Dierker, Jr. | A62C 3/07 169/46 |
| 8,169,338 | B2 * | 5/2012 | Mudalige | G08G 1/167 340/901 |
| 8,465,061 | B1 * | 6/2013 | Reid | B60B 39/022 291/38 |
| 9,333,995 | B1 * | 5/2016 | Piotrowski | B62D 35/001 |
| 9,440,493 | B1 * | 9/2016 | Ahern | B60B 39/04 |
| 2004/0070265 | A1 * | 4/2004 | Sakai | B60T 17/221 303/1 |
| 2004/0262425 | A1 * | 12/2004 | Sakai | B60B 39/024 239/128 |
| 2006/0060441 | A1 * | 3/2006 | Sakai | B60B 39/02 191/2 |
| 2008/0011526 | A1 * | 1/2008 | Grande | B60B 39/026 180/53.8 |
| 2014/0081515 | A1 * | 3/2014 | Goulet | B60B 39/022 701/36 |
| 2014/0130383 | A1 * | 5/2014 | Harrington | E02F 3/907 37/195 |
| 2014/0183879 | A1 * | 7/2014 | Piroozmandi | B60B 39/02 291/1 |
| 2016/0016558 | A1 * | 1/2016 | Santacroce | B60B 39/026 280/855 |
| 2016/0089933 | A1 * | 3/2016 | Toros | B60B 39/021 701/36 |

FOREIGN PATENT DOCUMENTS

| | | |
|---|---|---|
| DE | 2600787 A1 | 7/1977 |
| DE | 29716940 U1 | 1/1998 |
| DE | 10018906 A1 | 10/2001 |
| DE | 102010053308 A1 | 7/2011 |
| EP | 0208131 A1 | 1/1987 |
| EP | 0512264 A2 | 11/1992 |
| JP | S5387391 U | 7/1978 |
| JP | H05229461 A | 9/1993 |
| JP | H07279138 A | 10/1995 |
| JP | H07304303 A | 11/1995 |
| JP | H0948204 A | 2/1997 |
| JP | H09164804 A | 6/1997 |
| JP | H09188103 A | 7/1997 |
| JP | 2000264009 A | 9/2000 |
| JP | 2005008136 A | 1/2005 |
| JP | 2015521134 A | 7/2015 |
| WO | WO-2007056834 A1 * 5/2007 ................ B60S 1/68 |
| WO | WO-2008111039 A1 * 9/2008 ........... B60B 39/025 |
| WO | 2011102775 A1 | 8/2011 |
| WO | WO-2011102775 A1 * 8/2011 ........... B60B 39/026 |
| WO | 2013179159 A1 | 12/2013 |
| WO | 2014155884 A1 | 10/2014 |

OTHER PUBLICATIONS

Ditze, Michael, et al., "A Survey on Intelligent Vehicle Safety Systems for Adverse Weather Conditions," F2010D040, FISITA 2010 World Automotive Congress, Budapest, Hungary, May 2010, 8 pages.

Slingo, Julia, et al., "The Recent Storms and Floods in the UK," Met Office and Centre for Ecology and Hydrology Report, Feb. 2014, 29 pages.

International Search Report and Written Opinion for International Patent Application No. PCT/GB2017/052148, dated Nov. 10, 2017, 11 pages.

International Preliminary Report on Patentability for International Patent Application No. PCT/GB2017/052148, dated Feb. 7, 2019, 9 pages.

Notification of Reasons for Refusal for Japanese Patent Application No. 2019504706, dated Nov. 17, 2020, 13 pages.

* cited by examiner

VEHICLE TRACTION ENHANCEMENT

CROSS-REFERENCE TO RELATED APPLICATIONS

This application is a 35 U.S.C. § 371 national phase filing of International Application No. PCT/GB2017/052148 filed on Jul. 21, 2017, and claims the benefit of each of United Kingdom Patent Application No. 1613121.1 filed on Jul. 29, 2016 and United Kingdom Patent Application No. 1616543.3 filed on Sep. 29, 2016, wherein the disclosures of the foregoing applications are hereby incorporated by reference herein in their respective entireties.

TECHNICAL FIELD

The present disclosure relates to apparatus and methods for improving traction for vehicles travelling in wet or otherwise slippery conditions.

BACKGROUND

The opportunity to provide vehicle tires with an improved or dry road surface offers a significant opportunity to improve future vehicle safety. The forces generated in a tire contact patch that control traction, braking and cornering are greatly compromised by road surface contamination which in most areas of the world is predominantly in the form of surface water during or following rain.

In Europe a significant number of accidents are weather related, and in order to support EU targets, e.g. move close to zero fatalities by 2050 (European Commission, White paper on transport, 2011). Adverse weather conditions involving reduced traction as a consequence of wet, snowy and icy surfaces have been major contributory factors to traffic accidents in Europe. Extreme weather conditions are responsible for 39% of all traffic accidents in Germany. On Swedish roads 25% of accidents occur on wet roads, 16% on icy/snowy roads (Ditze, M. et al., 2010, *A Survey on Intelligent Vehicle Safety Systems for Adverse Weather Conditions. FISITA, Budapest,* 2010). The problem is not just restricted to Europe. In the USA on average, 6,250 people are killed and over 480,000 people are injured in weather-related crashes each year. (Source: *Ten-year averages from 2002 to 2012 analyzed by Booz Allen Hamilton, based on NHTSA data* http://www.ops.fhwa.dot.gov/weather/q1_roadimpact.htm).

The ambition to reduce accidents and fatalities is further challenged by evidence that global warming is leading to more regular occurrences of heavy rainfall as evidenced by a recent UK Met Office report that includes the following key quotes: "There is an increasing body of evidence that extreme daily rainfall rates are becoming more intense, and that the rate of increase is consistent with what is expected from fundamental physics". "There is no evidence to counter the basic premise that a warmer world will lead to more intense daily and hourly heavy rain events". (Slingo, J. et al., 2014. *The Recent Storms and Floods in the UK. Met Office and Centre for Ecology & Hydrology Report February* 2014, 27 pp.).

These weather patterns, that may include short very intense periods of rainfall, are particularly dangerous as visibility is impaired and standing surface water can build up rapidly on the road surface. Accidents in severe weather arise mainly due to a drastic loss of friction between the tires and the road surface. Aquaplaning, sometimes referred to as hydroplaning, occurs when a layer of surface water builds up between the tire and the road surface leading to a complete loss of grip. Aquaplaning is extremely dangerous and can occur at speeds of 50 mph (80 km/h) with as little as 2 to 3 mm of standing water. The loss of visibility in heavy rain combined with spray and splash, loss of visibility in snow or even the conditions of driving in high winds can add stress to the driving task and contribute to a loss of control. A common factor in accidents when road surface friction is reduced is how quickly total loss of control occurs. This presents a problem for even the most skilled drivers to regain control in such a short time. In good conditions where the road is dry and the tires are in good condition the coefficient of friction between the tire contact patch and the road surface is about 1.0. When the roads are wet, and depending on tire condition, this can be reduced to about 0.5, effectively a 50% loss in grip. This decrease in the coefficient of friction is demonstrated by the increased braking distance on wet roads. According to the UK Highway code stopping distances approximately double on wet roads. Although the tread design of modern tires is highly advanced and assists in moving surface water away from the tire contact patch, serious conditions that lead to aquaplaning still occur.

With modern tires there exists a compromise between grip and fuel efficiency. The fuel used to propel our vehicles is expended overcoming parasitic losses such as aerodynamic drag, mechanical losses in the powertrain and accelerating the vehicle mass. A fourth parasitic loss exists in the form of tire rolling resistance which accounts for approximately 20% of all fuel used by the vehicle, 1 tank in 5, while driving. These losses occur due to the mechanical and material design of the tire and the operational need for the tire to present a significant contact area to the road surface resulting in continuing deformation of the tire structure as it rolls into, through and out of the contact patch area. Designing tires to be more fuel efficient is constrained by the need to provide grip, particularly on low friction surfaces such as those occurring in the wet.

EP 208131, EP 0512264, WO 2011/102775, U.S. Pat. No. 4,063,606, DE 102010053308, DE 100118906 all describe nozzle based systems configured to project a single jet of air in front of a tire wherein the nozzle is located close to the road surface.

U.S. Pat. No. 3,544,370 describes the combined use of a deflector and a nozzle for supplying gas to a road surface.

The present disclosure aims to provide a system, external to the tire, which provides an opportunity to reduce the effect of wet road surfaces and can offer opportunities to remove some constraints in tire design and to pursue further reductions in tire rolling resistance.

SUMMARY

When viewed from a first aspect the present invention provides a vehicle comprising: a plurality of wheels; a control system arranged to issue a signal in the event of determining that one or more wheels of the vehicle has lost, or is at risk of losing, frictional contact with a road surface; a gas source arranged to supply a burst of gas upon said signal being issued; and at least one gas outlet connected to said gas source and arranged to direct said burst of gas so as to clear water and/or debris from the road surface in front of at least one of the wheels.

When viewed from an alternative aspect the present invention provides apparatus on a wheeled vehicle comprising: a control system arranged to issue a signal in the event of determining that one or more wheels of the vehicle has lost, or is at risk of losing, frictional contact with a road surface; a gas source arranged to supply a burst of gas upon said signal being issued; and at least one gas outlet connected to said gas source and arranged to direct said burst of gas so as to clear water and/or debris from the road surface in front of at least one of the wheels.

When viewed from another aspect the invention provides apparatus for a wheeled vehicle comprising a control system arranged to issue a signal in the event of determining that one or more wheels of the vehicle has lost, or is at risk of losing, frictional contact with a road surface, the apparatus comprising a gas source arranged to supply a burst of gas upon receiving said signal; and at least one gas outlet connected to said gas source and arranged to direct said burst of gas so as to clear water and/or debris from the road surface in front of at least one of the wheels.

Thus it will be seen by those skilled in the art that in accordance with the invention a gas source is able to supply a burst of gas which can move and/or lift surface water and other debris from the road. The opportunity to provide a dry road surface in front of tires offers a significant improvement to vehicle safety. The forces generated in a tire contact patch control traction, braking and cornering. These forces are greatly compromised by road surface contamination, which is mostly in the form of surface water following rain. In serious weather conditions aquaplaning can still occur, despite the advanced tread design of modern tires. A dry road surface in front of a tire will limit the possibility of aquaplaning. Furthermore, when the frictional contact with the road is reduced, braking distances are adversely affected. Providing a dry road surface in front of the tire will reduce braking distance, thus enhancing safety. This is particularly important in the event of emergency braking. The burst of gas could therefore be deployed when anti-lock brakes are employed for example. The system may also assist in preventing loss of control on snow, slush, mud etc.

The gas source could take a number of different forms. For example, the gas source could comprise a compressed gas cylinder, gases from a chemical reaction, or any other means capable of supplying high velocity gases.

In a set of embodiments the gas source comprises exhaust gases from a pyrotechnic explosion. A pyrotechnic explosion provides hot gases at very high velocity. This will happen for a short duration but the Applicant has appreciated that this can be sufficient to assist the safe retrieval of vehicle control. A pyrotechnic explosion can be also be quickly activated. Pyrotechnics are already used safely in vehicles, for example to control the firing of airbags or the deployment of pedestrian friendly bonnets. Optionally the gas source is single use and can be easily replaced after use.

In some embodiments the vehicle comprises one or more further gas outlets arranged to direct a, or the, burst of gas so as to clear water and/or debris from the road surface in front of all of the wheels which are directly driven. Additional gas outlets may be arranged to direct a, or the, burst of gas so as to clear water and/or debris from the road surface in front of any non-driven wheels. For example, for a motor cycle a gas outlet may be provided for the front and the real wheel. For a three-wheeled vehicle, the gas source may be provided in front of the two laterally spaced wheels at the front or rear, or for all three wheels. For vehicles with a greater number of wheels, a gas outlet may be provided at least in front of all the wheels which are used for steering, and may be provided for all or a selection of the other wheels, as deemed necessary.

Preferably, the gas outlet, or each of the outlets, is disposed closely adjacent to the road surface—e.g. spaced by less than 5 cm, e.g. less than 2 cm, e.g. less than 1 cm—enabling more effective removal of surface water and/or debris.

In some embodiments, the vehicle comprises a further gas source. This could be used simply to enhance the burst of gas, but preferably it allows for removal of water or other road surface contaminants over a longer period of time than the burst of gas described above. This may provide an improvement in friction between the tire and the road in circumstances which do not call for the emergency deployment of the burst of gas.

The further gas source may be provided by any of a number of methods, e.g. a compressed air cylinder, air extracted from cooling fans or from a compressor. In a set of embodiments however the further gas source comprises a vent arranged to draw in ambient air. For example, air could be diverted from the vents presently provided on some vehicles for air cooling of brakes. Preferably however one or more dedicated vents are provided.

It is envisaged that the additional gas source will supply air, although it could be another gas, such as nitrogen, or be air mixed with another gas.

As mentioned above it is beneficial for the gas outlet to be as close to the road surface as possible. On the other hand, it is important to avoid the gas outlet striking the surface of the road if the surface is uneven for example. In a set of embodiments the or each gas outlet is therefore arranged on a mounting so as to be movable towards and away from the road surface. This allows the gas outlet to be deployed only when required or likely to be required. The mounting could, for example, be controlled by the control system. Where the vehicle has a plurality of gas sources they may move in unison, or may move individually.

The outlet may be deployed from its stored position using a small motor, a spring, a suspension component, or pneumatic or hydraulic actuator. The outlet could be attached to the wheel knuckle in order to maintain control of its height above the road surface as attaching the device to the vehicle body would result in road impacts as the body bounces and pitches on the vehicle suspension. A load cell could also be included in the deployment mechanism to provide optimal height control depending on the road conditions such as surface water, snow or slush.

When the gas outlet is in its stored position it is typically protected from impact with the road surface and does not contribute to the air resistance of the vehicle. In the situation where the weather is not severe and the gas outlet is in a stored position but loss of friction and control is suddenly detected, the gas outlet and source can advantageously be deployed as rapidly as possible from the stored position to the emergency operating position. In a set of embodiments the gas source, e.g. the pyrotechnic exhaust gases, could provide enough energy to deploy the gas outlet from its stored to its operating position, i.e. so as to over-ride any mounting or movement system and provide the thrust on initial firing to operate the mechanism and move the gas outlet rapidly into the operating position close to the road.

In some embodiments the gas outlet comprises a nozzle. Additionally or alternatively the gas outlet comprises a valve configured to accelerate gas. The valve configured to accelerate gas may be, for example, a convergent-divergent nozzle, such as a de Laval nozzle. A de Laval nozzle is able to accelerate a hot, pressurised gas to a high speed in the axial (thrust) direction, by converting the heat energy of the flow into kinetic energy. Increasing the velocity of the gas improves the response time of the system and increases the momentum of the gas. High momentum gas is able to clear a larger area of road as it is able to displace a larger volume of water.

In some embodiments, the control system comprises an on-board camera, laser, tire based sensors or rain sensors. Many of these sensors already exist in vehicles. For example, rain sensors inform the operation of windscreen wiper systems and traction control systems utilise information from wheel sensors.

Such a control system may also be informed by data from Vehicle-to-Vehicle (V2V) and Vehicle-to-Infrastructure (V2I) communication systems. Examples of control systems on modern vehicles are Advanced Driver Assistance Systems such as Lane Keeping and Adaptive Cruise Control. Active safety systems such as Emergency Braking Assistance and next generation systems for providing Road Departure Prevention may also be used. These systems will increasingly use other information protocols external to the vehicle to gather data such as V2V or V2I. This means for example that a vehicle travelling several hundred metres in front in a country lane could provide information on say pooled surface water which would inform the operation of a system of the kind described herein. Future V2I systems may also include road profiling information regarding bumps and potholes for example. While these systems may be used to provide information for active suspension systems and magneto-rheological dampers, the information could also be used to inform the operation of a system in accordance with the present invention. It is therefore intended that the data captured to inform the operation of the system can be obtained from sensors already installed to support existing and next generation vehicle safety systems.

In a set of embodiments the vehicle further comprises a deflector configured to deflect water and/or debris from said road surface in a vicinity of said wheel. In a set of such embodiments the deflector comprises a single laterally directed surface. The deflector may be deployed in front of the tire, close enough to the road to reduce the amount of water and/or other debris getting to the tire in order generally to improve driving conditions. As described above for the gas outlet, it may be spaced e.g. by less than 5 cm, e.g. less than 2 cm, e.g. less than 1 cm.

The deflector is advantageously made from a durable material appropriate to its location and exposure to a harsh environment. For example, a rubber-like material similar to that used in the manufacture of mud flaps could be used. Should excessive wear occur over time, the lower section of the deflector, where the most wear occurs, may be designed as an inexpensive replaceable service item.

When viewed from another aspect the invention provides a vehicle comprising a plurality of wheels; a gas source; at least one gas outlet connected to said gas source and arranged to direct said gas so as to clear water and/or debris from the road surface in front of at least one of the wheels; and a deflector configured to deflect water and/or debris from said road surface, wherein said gas outlet is attached to or integrated with said deflector.

When viewed from another aspect the invention provides apparatus on a wheeled vehicle comprising a gas source: at least one gas outlet connected to said gas source and arranged to direct said gas so as to clear water and/or debris from the road surface in front of at least one of the wheels; and a deflector configured to deflect water and/or debris from said road surface, wherein said gas outlet is attached to or integrated with said deflector.

Optionally, the gas source is arranged to supply a burst of gas as described in accordance with the first aspect of the invention.

Optionally, in accordance with either of the foregoing aspects of the invention, the gas outlet is attached to, or integrated, with the deflector.

In a set of embodiments a position of the deflector relative to the road surface can be controlled. For example in non-severe weather conditions the deflector could be stored away from the road surface. It is thus envisaged that the deflector could be movable both towards and away from the road surface. As described above for the gas outlet, the deflector could be attached to the vehicle via a small motor, a spring, a hydraulic or a mechanic actuator. A load cell could also be included in the deployment mechanism to provide optimal height control depending on the road surface conditions.

In a set of embodiments the deflector is rotatable about a substantially vertical axis. The deflector can then be set at an angle to move water and/or debris in a certain direction. Thus, for example, if there are two laterally spaced wheels on the vehicle, the deflectors may deflect the water to both sides of the vehicle, or to one side of the vehicle. Conveniently a computer based control of the device—such as the aforementioned control system—will use information from sensors to set the angle of the deflector in a plan view to provide the most optimal performance.

If, during severe weather and heavy traffic, the majority of vehicles are fitted with deflectors of the kind described and they are all deployed, the vehicles may effectively "sweep" water snow or slush away from the road. In this way overall road conditions may be improved and all road users also may be exposed to less spray and have better visibility.

While the above described system is primarily aimed at the removal of surface water, the system could easily be designed to cope with soft snow, slush, sand or other friction compromising materials such as wet leaves or mud.

The arrangements described herein could be used for all road vehicles, including cars, buses, trucks, and motorcycles, but could also be used on non-road vehicles, for example agricultural machinery, aircraft, and trains.

BRIEF DESCRIPTION OF DRAWINGS

One or more non-limiting examples will now be described with reference to the accompanying drawings, in which.

DETAILED DESCRIPTION

Figure 1:
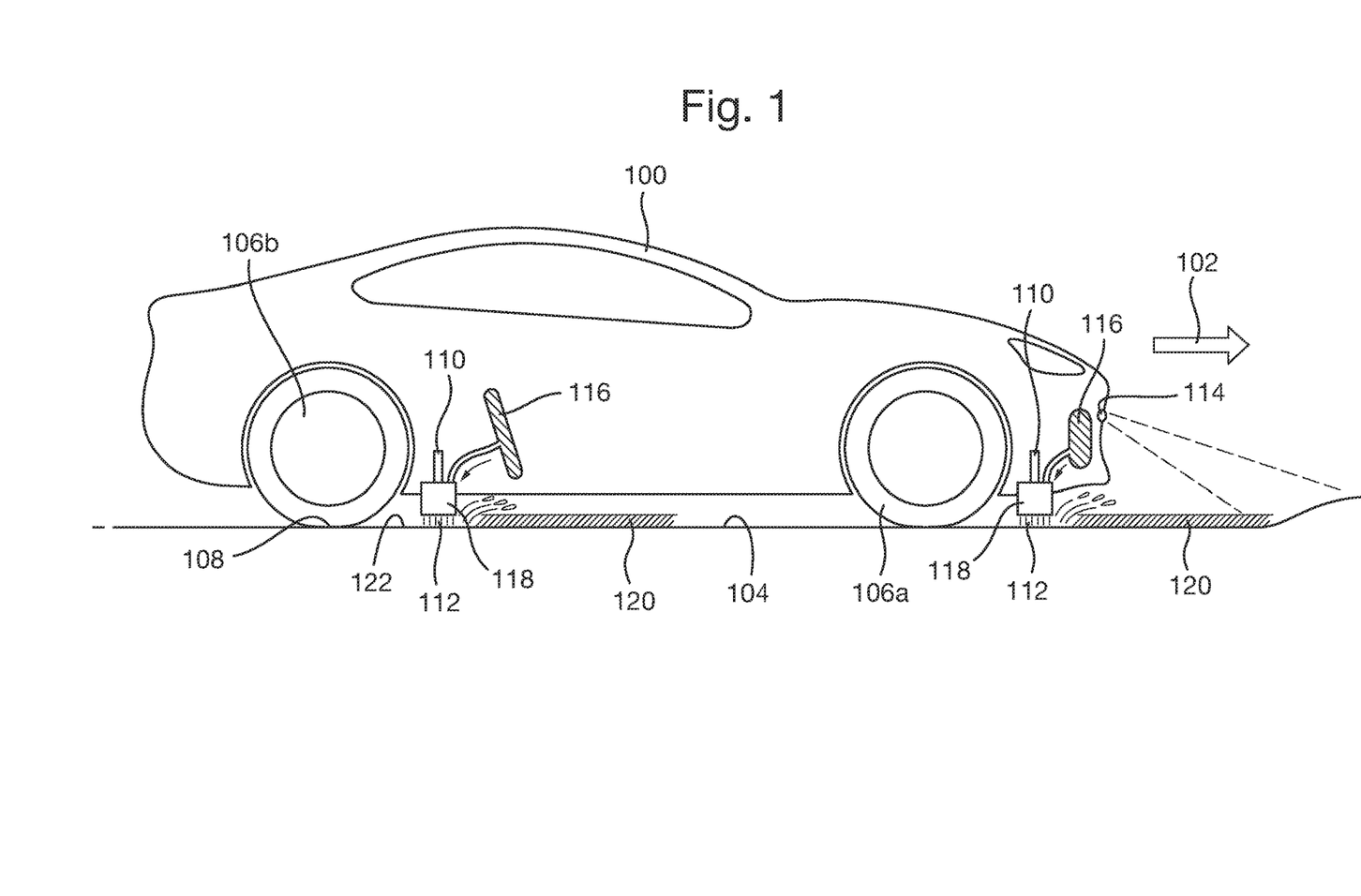
FIG. 1 shows a vehicle in accordance with an embodiment of the invention.

FIG. 1 shows a side view of a vehicle 100 embodying the invention moving in the direction of the arrow 102 along a road surface 104. The Figure shows one of the front wheels 106a and one of the rear wheels 106b. The wheels 106a, 106b contact the road surface 104 over respective contact patches 108. Mounted to the vehicle chassis in front of each wheel 106a, 106b is a gas source 110—in this case a pyrotechnic gas cylinder—and a gas outlet 112 which are described in greater detail hereinbelow. The pyrotechnic gas cylinder 110 is single use, removable and replaceable.

The vehicle also has a number of sensors forming part of a typical vehicle monitoring system, represented schematically by an on-board-camera 114. Such a system, may typically include a large number of sensors such as temperature sensors, wheel monitoring sensors etc.

An additional gas source is provided by vents 116 in the vehicle's body which are designed to draw in ambient air as the vehicle is travelling.

A deflector 118 is positioned in front of each wheel 106a, 106b. FIG. 1 also shows diagrammatically a layer of water and/or debris 120 on the road surface.

Figure 2:
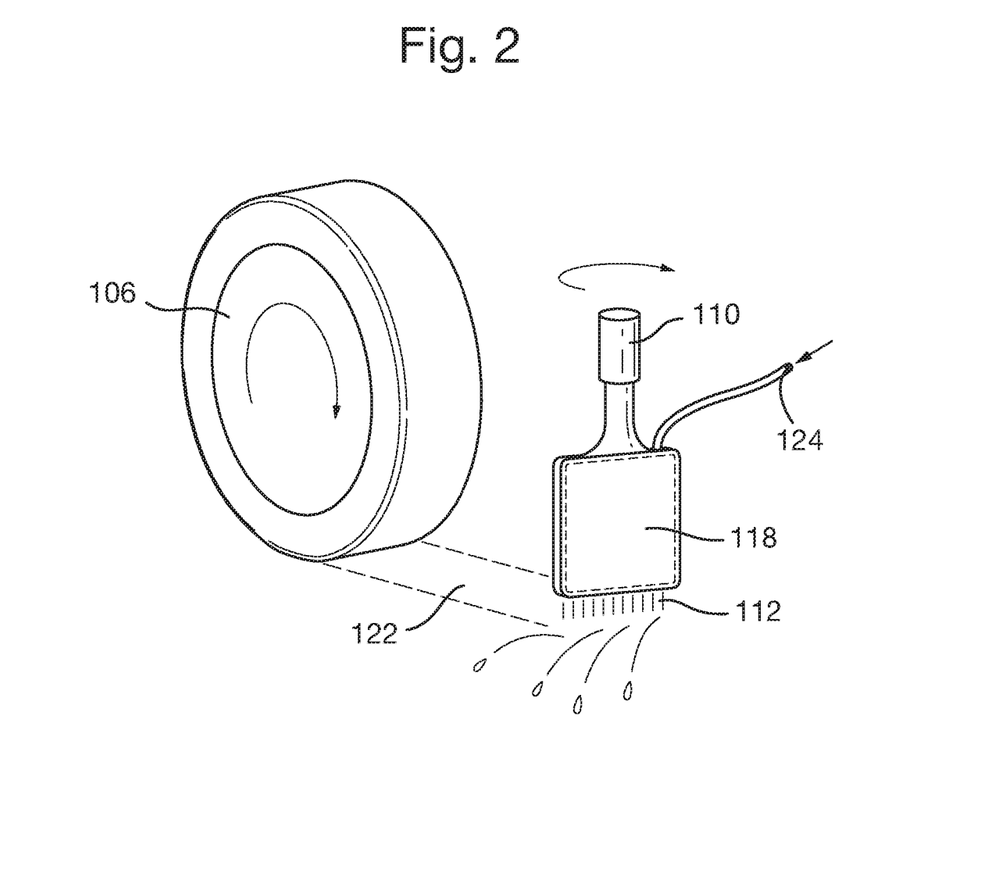
FIG. 2 shows part of the embodiment of FIG. 1 including a gas source, a gas outlet and deflector positioned in front of a wheel.
Figure 3:
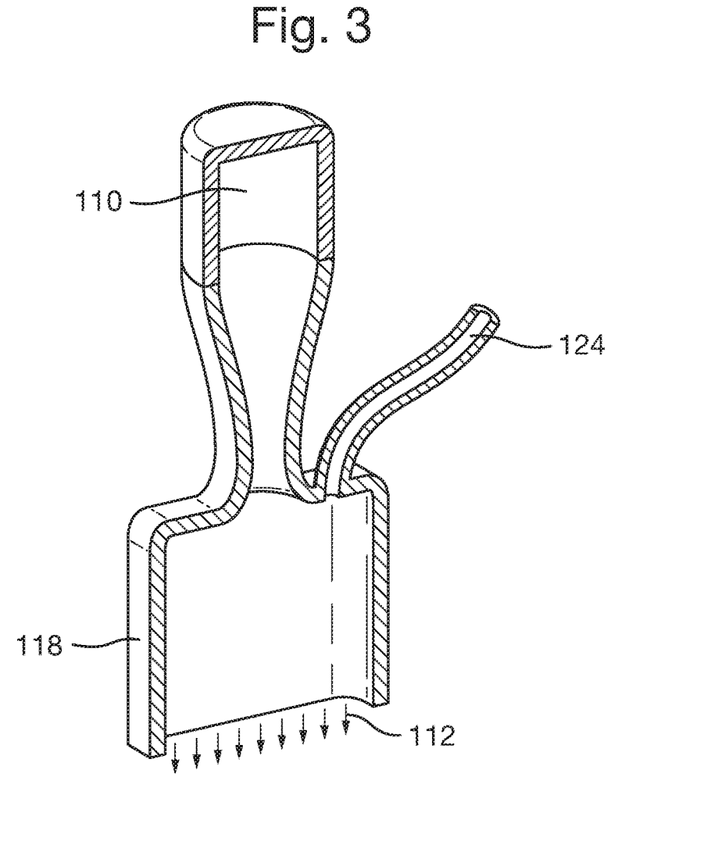
FIG. 3 shows a cross section of the gas source and deflector of FIG. 2.

FIG. 2 shows in more detail the pyrotechnic cylinder 110 positioned in front of a wheel 106. The pyrotechnic cylinder 110 is connected to a deflector 118 which, as is shown in FIG. 3, defines an internal chamber that acts as a plenum to distribute gas entering from the upper end to a plurality of nozzles at the lower end, forming a gas outlet 112. The plenum has a convergent-divergent, or waisted, profile to provide a de Laval nozzle shape.

Also connected to the internal chamber is a channel or conduit 124 which communicates with the vent 116 (see FIG. 1) mentioned above. The nozzles forming the gas outlet 112 direct gas from the cylinder 110 so as to clear water and/or debris from the road surface in front of the wheel 106 so as to provide a dry area 122 behind the gas outlet 112 and in front of the wheel 106.

The system shown in the Figures is provided on a four-wheeled passenger vehicle. In this embodiment four gas cylinders 110 and deflectors 118 are provided, one for each wheel 106a.b (only two of which are shown).

The deflector 118 is close enough to the road to reduce the amount of water or other debris getting to the tire—e.g. approximately 5 mm. This deflector generally improves driving conditions and could be fixed or, as in this embodiment, can be deployed from a stored position to the illustrated operating position as driving conditions become worse, but before there is a need for emergency intervention.

The deflector may be constructed from a tough and resilient rubber based material appropriate to its location. The deflector may also comprise a wear resistant replaceable impact strip.

The deflector may provide a lower aerodynamic drag coefficient than the tire itself and the overall drag force on the vehicle may thus be reduced, assisting fuel economy.

Figure 4:
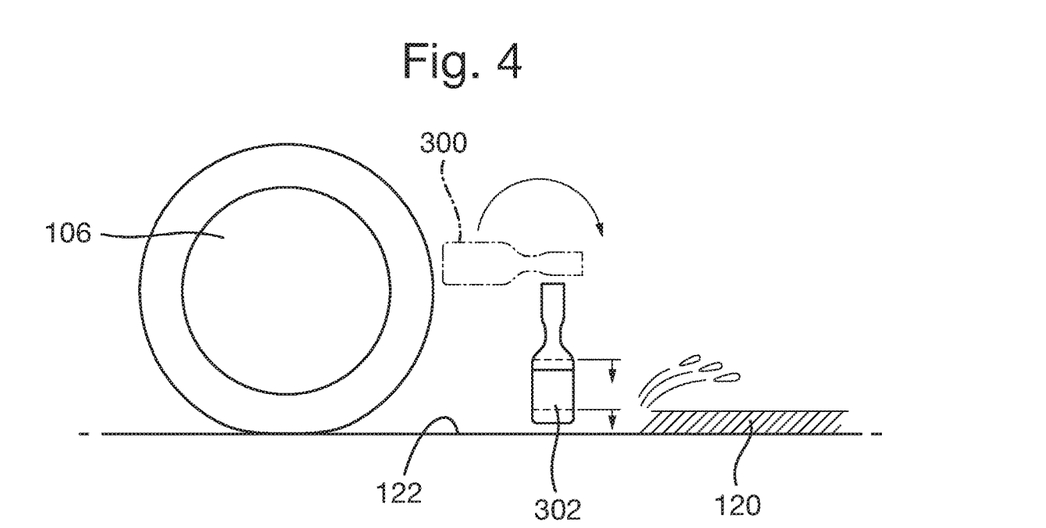
FIG. 4 shows the movement of the components of FIGS. 2 and 3 relative to the wheel.

FIG. 4 shows the selective deployment of the deflector 118. In particular it shows the deflector 118 in a stored position 300 and a deployed, operating position 302. In both the stored and deployed positions 300, 302 the deflector 118 and pyrotechnic canister 110 are positioned forward of the wheel 106.

Upon receipt of an appropriate signal from the control system, the deflector 118 can be deployed so that the gas outlet 112 is close to the road surface. A clearance of about 5 mm is envisaged as mentioned earlier.

In use information is provided from sensors 114 to a vehicle control system to control the operation of the deflectors 118 and gas sources 110. The sensors 114 can scan the road ahead to provide critical operational information describing the oncoming road conditions. Information can also be obtained from wheel rotation sensors which can, for example, determine if one or more wheels has lost grip of the road surface. This information is then provided to an on-board computer system controlling operation of the system as is described further below.

In benign driving conditions the deflector 118 will be in the stored position 300; whereas, if weather conditions deteriorate the deflector 118 can be deployed to the operating position 302. When deployed the deflector 118 is close enough to the road to reduce the amount of water and/or other debris getting to the tire. The air entering the deflector 118 from the vents 116 via the channel 124 can provide a steady flow which is able to lift and move surface water from the road in front of the tires albeit that it has relatively low momentum. Additional air can come from multiple sources that include conventional air vents, electric motors (where fitted to electric vehicles or hybrid electric vehicles) etc.

In the event of an emergency where the vehicle has lost frictional contact with the road, or is in imminent danger of doing so, a signal is generated by the vehicle control system and is sent to the pyrotechnic cylinder 110. Upon receiving this the cylinder 110 activates and expels a rapid burst of hot gas through the nozzle interior chamber of the deflector 118 which has a waisted section to form a de Laval nozzle. This nozzle is designed to accelerate the hot gas towards the gas outlet 112. The hot gas is then able to lift and or move the surface water 120 from the road providing a dry section of road 122 for the tire to move along. Ideally the deflector 118 is already in its operating position when the above-mentioned signal is triggered. However if it is not, the deployment mechanism is arranged to permit forceful deployment under the force of the explosive gases from the cylinder 110.

Another embodiment will now be described with reference to FIGS. 5A and 5B. This is very similar to the previous embodiment except that the deflectors can be adjusted.

Figure 5A:
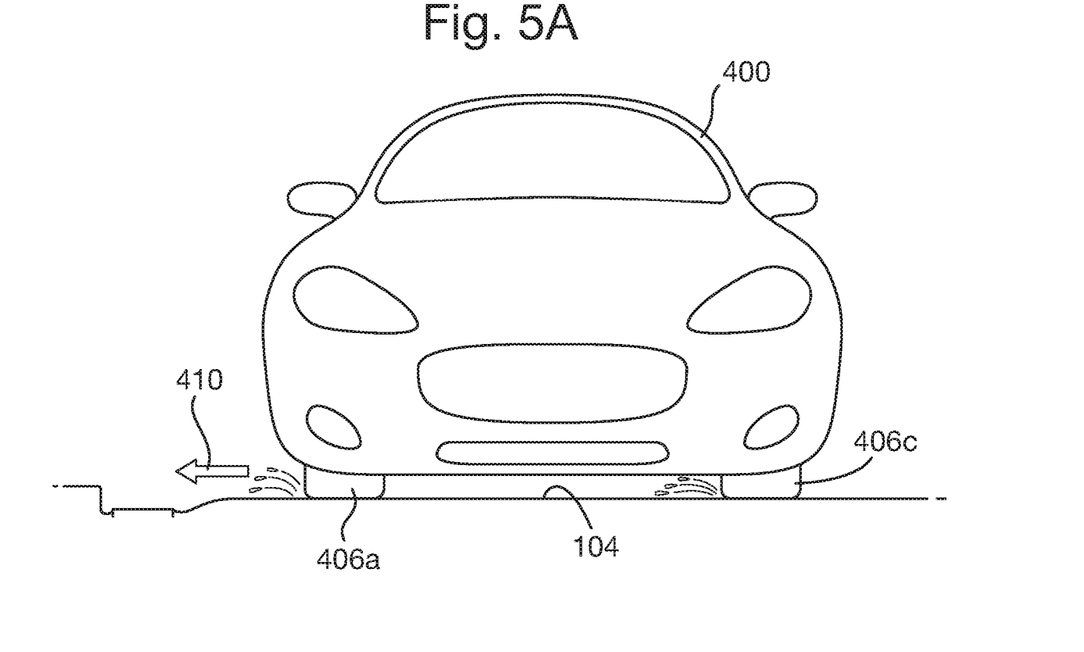
FIGS. 5A and 5B show front and top views respectively of another embodiment providing movement of water and/or debris to the side of the road.

FIG. 5A shows a front view of the vehicle 400 of another embodiment on a road surface 104. Also shown are the two front wheels 406a, 406c. An arrow 410 shows the direction in which water and/or debris cleared from the road surface is moved. The arrow 410 is directed towards the side of the vehicle 400.

Figure 5B:
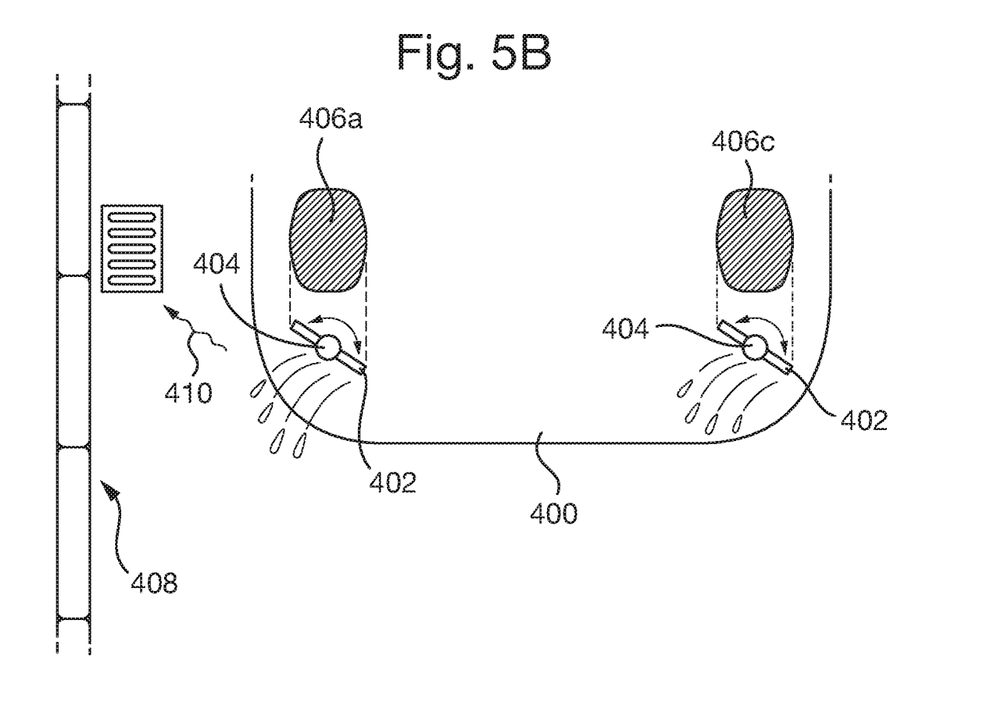

FIG. 5B shows a top view of the vehicle 400 also showing the front wheels 406a, 406c. In front of each wheel 406a, 406c is a deflector 402 and a deflector mounting 404. In this embodiment the deflector 402 can be rotated about the mounting 404 in order to clear water and/or debris from the road surface in the direction of the arrow 410 towards the side of the road 408. The control system may use information from sensors on the vehicle to set the angle of rotation of the deflector 402 about the deflector mounting 404 to provide the most optimal performance.

The deflectors 402 can be adjusted and rotated to push the surface water and/or debris to the left or the right of the vehicle depending on the side of the road used for driving in the country of operation. The deflector may have a single inclined surface for deflecting water and/or debris to one side. For vehicles moving from country to country, asymmetric deflectors can be adjusted to the change in driving.

During severe weather and heavy traffic, if the majority of vehicles are fitted with such deflectors 402 the vehicles may effectively "sweep" water and/or debris away from the road. In this way overall road conditions may be improved for all road users who will also be exposed to less spray and have better visibility.

The development and optimisation of the system can be achieved through the use of advanced computer simulations, wind tunnel studies and ground testing. These methods can optimise the shape of the deflector and the optimal position to provide the desired "sweeping" effect.

Many variations and modifications of the arrangements described above may be made within the scope of the invention as defined in the attached claims.

The invention claimed is:

1. A vehicle comprising:
   a plurality of wheels;
   a control system arranged to issue a signal in the event of determining that one or more wheels of the vehicle has lost, or is at risk of losing, frictional contact with a road surface;
   a plurality of gas sources, wherein each wheel of the plurality of wheels has associated therewith at least one gas source of the plurality of gas sources, and each gas source of the plurality of gas sources is arranged to supply a respective burst of gas upon said signal being issued;
   wherein each gas source of the plurality of gas sources is connected, via a respective deflector comprising a flat internal chamber that acts as a plenum, to a respective gas outlet to direct said respective burst of gas so as to clear water and/or debris from the road surface in front of the wheel with which the gas source is associated.

2. An apparatus on a wheeled vehicle comprising:
   a control system arranged to issue a signal in the event of determining that one or more wheels of the vehicle has lost, or is at risk of losing, frictional contact with a road surface;
   a plurality of gas sources, wherein each wheel of the plurality of wheels has associated therewith at least one gas source of the plurality of gas sources, and each gas source of the plurality of gas sources is arranged to supply a respective burst of gas upon said signal being issued; wherein each gas source of the plurality of gas sources is connected, via a respective deflector comprising a flat internal chamber that acts as a plenum, to a respective gas outlet to direct said respective burst of gas so as to clear water and/or debris from the road surface in front of the wheel with which the gas source is associated.

3. The vehicle according to claim 1, wherein each gas source of the plurality of gas sources comprises exhaust gasses from a pyrotechnic explosion.

4. The vehicle according to claim 1, wherein each gas outlet of the respective gas outlets is arranged on a respective mounting so as to be movable towards and away from the road surface.

5. The vehicle as claimed in claim 4 wherein each of said respective mountings is controlled by the control system.

6. The vehicle according to claim 1, wherein each gas source of the plurality of gas sources is single use and replaceable.

7. The vehicle according to claim 1, comprising a further gas source arranged to supply gas to said respective gas outlets or a further gas outlet arranged to direct said gas so as to clear water and/or debris from the road surface in front of said wheels.

8. The vehicle according to claim 7 wherein said further gas source comprises an air intake located on the vehicle.

9. The vehicle according to claim 1, wherein the plurality of gas outlets comprise a nozzle.

10. The vehicle according to claim 1, wherein the plurality of gas outlets comprise a valve configured to accelerate gas.

11. The vehicle according to claim 1, wherein the plurality of gas outlets comprise a de Laval nozzle.

12. The vehicle according to claim 1, wherein the control system comprises an on-board camera, a laser, a tire-based sensor, or a rain sensor.

13. The vehicle according to claim 1, wherein the control system is informed by data from Vehicle-to Vehicle (V2V) and Vehicle-to-Infrastructure (V2I) communication systems.

14. The vehicle according to claim 1, wherein the deflectors are configured to deflect water and/or debris from said road surface.

15. The vehicle according to claim 1, wherein the gas outlets are attached to or integrated with the deflectors.

16. The vehicle according to claim 1, wherein the deflectors are movable automatically towards and away from the road surface.

17. The vehicle according to claim 1, wherein the deflectors are rotatable about a substantially vertical axis.

18. An apparatus for a wheeled vehicle comprising a control system arranged to issue a signal in the event of determining that one or more wheels of the vehicle has lost, or is at risk of losing, frictional contact with a road surface, the apparatus comprising:
   a plurality of gas sources, wherein each wheel of the plurality of wheels has associated therewith at least one gas sources of the plurality of gas source, and each gas source of the plurality of gas sources is arranged to supply a respective burst of gas upon receiving said signal; wherein each gas source of the plurality of gas sources is connected, via a respective deflector comprising a flat internal chamber that acts as a plenum, to a respective gas outlet to direct said respective burst of gas so as to clear water and/or debris from the road surface in front of the wheel with which the gas source is associated.

* * * * *